United States Patent
Mader

[15] 3,646,375
[45] Feb. 29, 1972

[54] MOTORIZED POTENTIOMETER WITH OVERLOAD CLUTCH AND INTERCHANGEABLE GEAR RATIO

[72] Inventor: Lawrence Mader, Yankton, S. Dak.
[73] Assignee: Dale Electronics, Inc., Columbus, Nebr.
[22] Filed: Dec. 30, 1970
[21] Appl. No.: 102,805

[52] U.S. Cl. ............................................. 310/83, 310/78
[51] Int. Cl. ........................................................ H02k 7/05
[58] Field of Search ............... 310/83, 75, 78, 76, 80, 100, 310/92, 96, 99; 74/785, 801; 192/56, 20

[56] References Cited

UNITED STATES PATENTS

| | | |
|---|---|---|
| 1,293,646 | 2/1919 | Kurtz ........................................ 310/99 |
| 2,493,721 | 1/1950 | La Brie ...................................... 310/100 |
| 3,054,304 | 9/1962 | Jursik ......................................... 310/78 |
| 3,521,095 | 7/1970 | Russo ......................................... 310/83 |

Primary Examiner—J. D. Miller
Assistant Examiner—R. Skudy
Attorney—Nolte and Nolte

[57] ABSTRACT

A compact gear motor having a planetary differential gear reduction system and an overload clutch which can be manually adjustable for clutch torque. The gear train accommodates interchangeable gears in order to change the output speed of the device. The gear motor drives a rotatable load such as a potentiometer, which is removably mounted directly to a hinged plastic motor housing.

16 Claims, 9 Drawing Figures

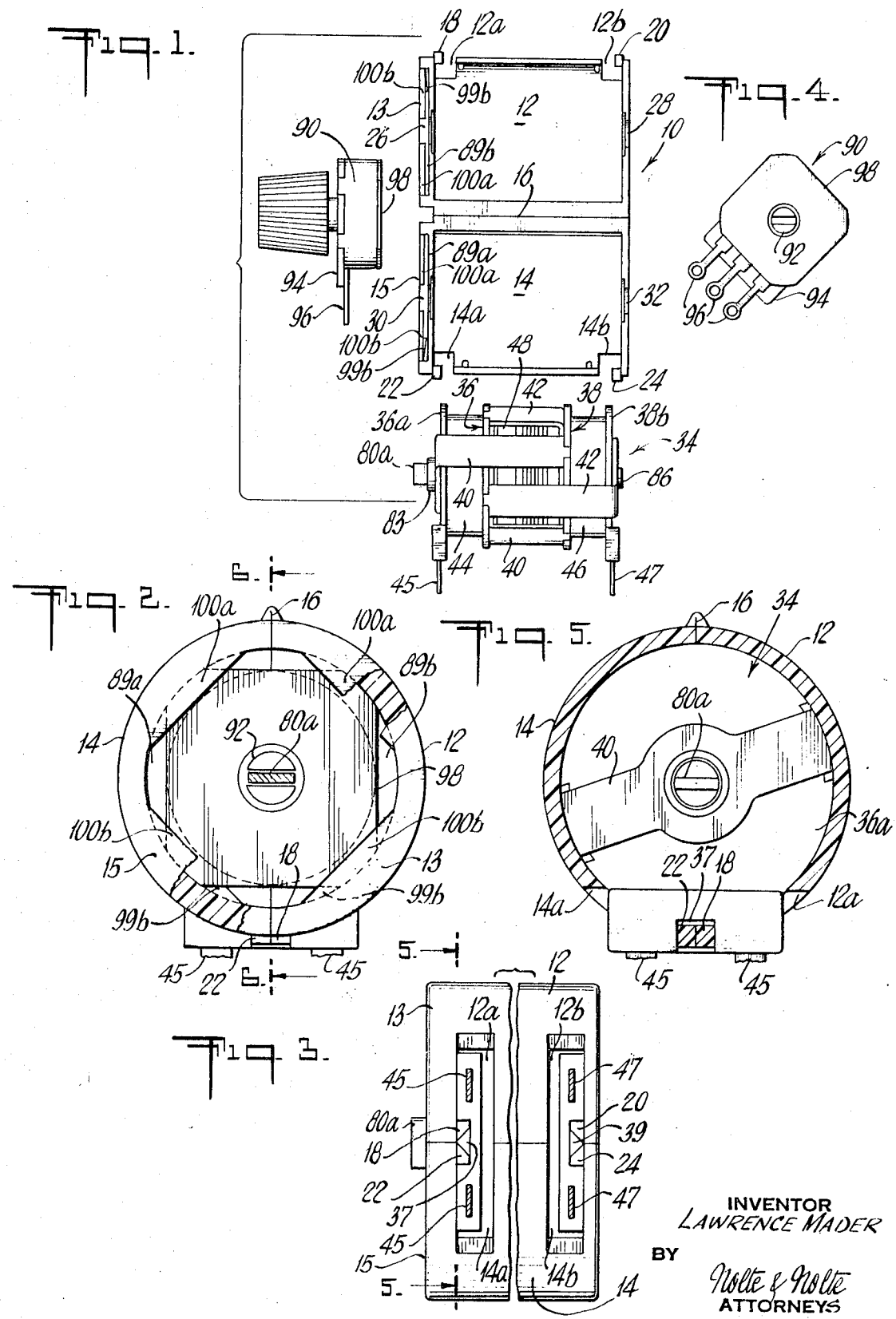

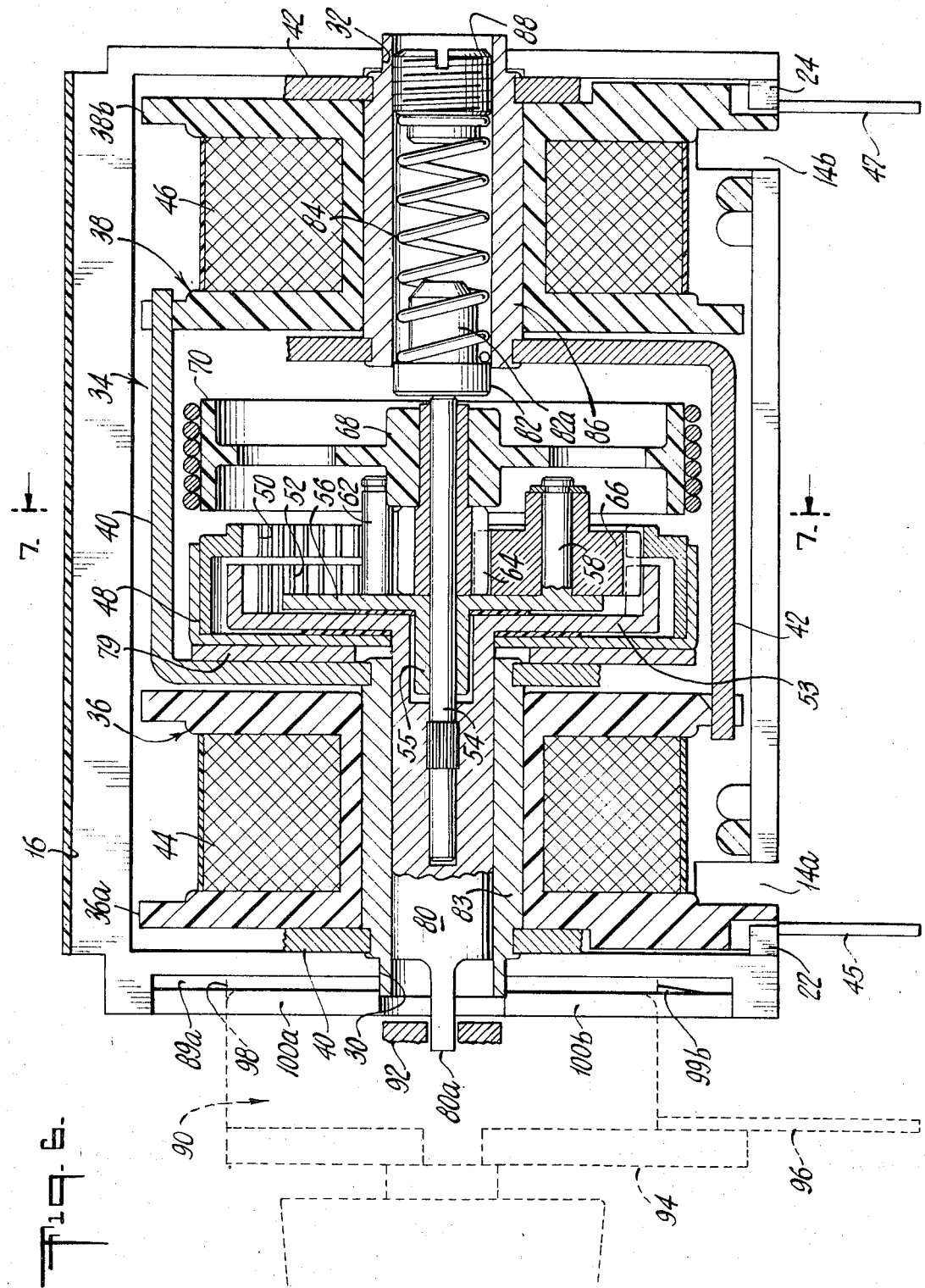

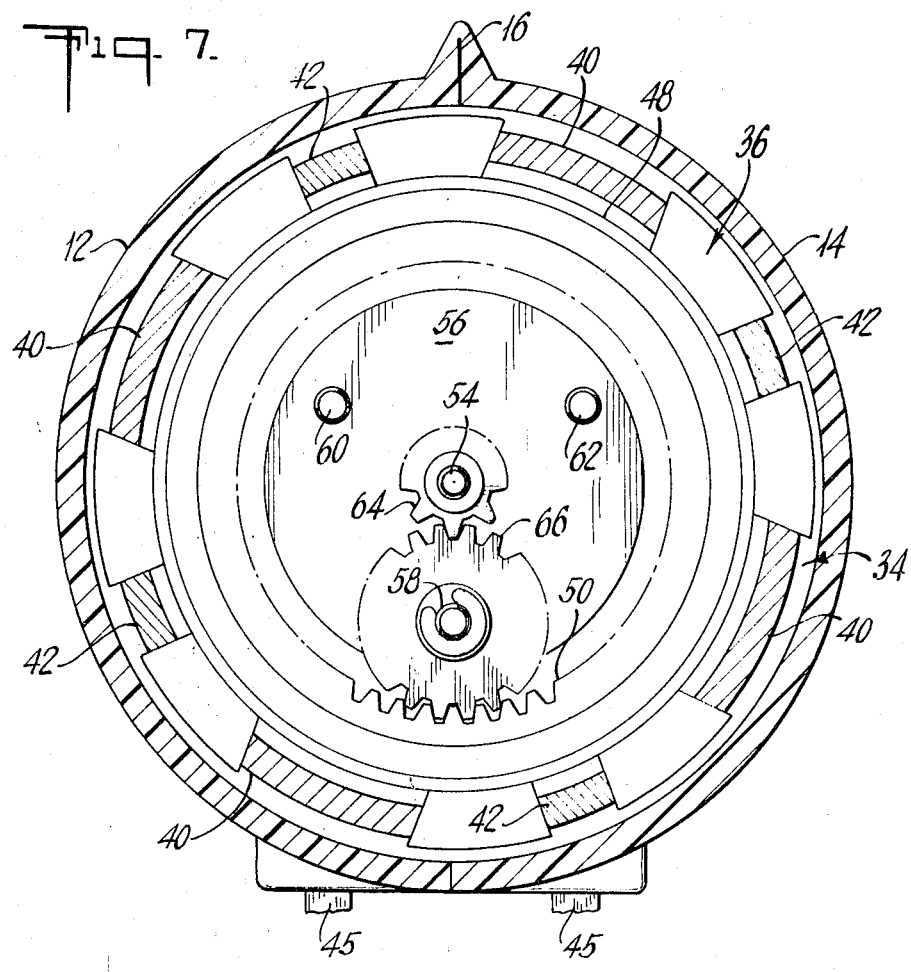
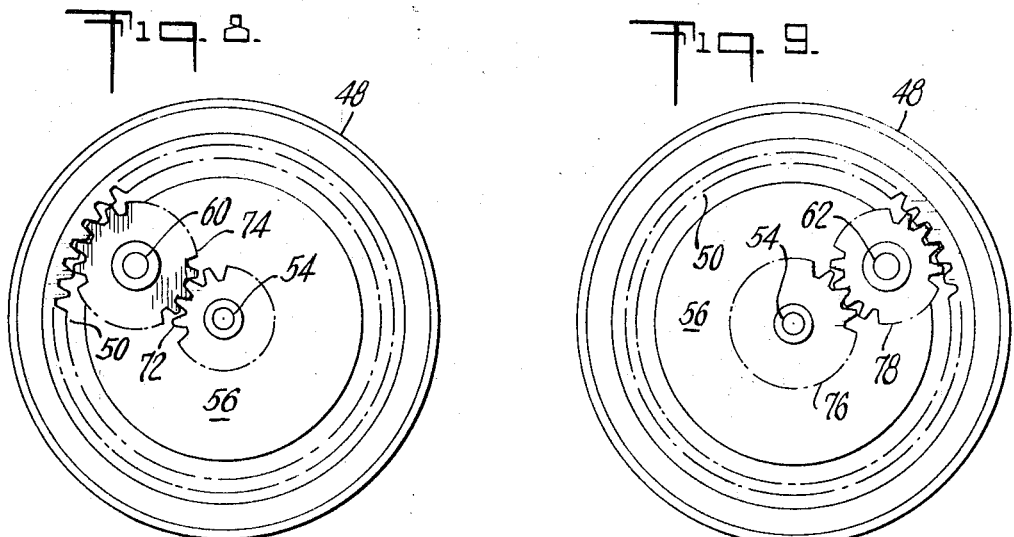

3,646,375

MOTORIZED POTENTIOMETER WITH OVERLOAD CLUTCH AND INTERCHANGEABLE GEAR RATIO

This invention relates to a compact gear motor incorporating a planetary gear reduction system, an adjustable overload clutch, and a rotatable load such as a potentiometer removably mounted on the motor housing.

It is an object of the present invention to provide a compact gear motor for a rotative load that incorporates a planetary differential gear reduction system as well as an overload clutch which eliminates potential damage to the rotor, gear reduction system and/or load due to excessive motor or load torque or attempted manual rotation of the load during electrical operation.

It is a further object of the present invention to provide a motorized potentiometer that is easily and rapidly assembled without the use of tools and has a reduced number of parts. The foregoing is achieved by means of a motor having coil forms with integral terminals, and a single, one-piece hinged plastic housing for the motor, gear assembly and clutch that functions also as a dust cover and also as a means for removably mounting the potentiometer to the motor without the use of tools.

It is a further object of the present invention to provide said overload clutch with an adjustability thereby limiting output or manual torque. The clutch permits manual rotation of the potentiometer without the gear noise and rotor inertia present in directly coupled systems.

It is another object of the present invention to provide a gear motor that can be easily and rapidly changed to any of several commonly required output speeds.

A further object of the present invention is to reduce the overall size of the system and render the same compact.

The invention is illustrated by way of example in the accompanying drawings which form a part of this application and in which:

FIG. 1 is a top plan view of the potentiometer, gear motor and housing in a dissassembled condition;

FIG. 2 is an end elevation view of the gear motor with the potentiometer removed;

FIG. 3 is a partial side elevation of the gear motor showing the means for a snap-shut securement of the gear motor in its housing;

FIG. 4 is an end elevation view of the potentiometer showing the coupling device for connecting to the gear motor;

FIG. 5 is a sectional view taken along the lines 5—5 of FIG. 3;

FIG. 6 is a sectional view of the gear motor taken along the lines 6—6 of FIG. 2;

FIG. 7 is a sectional view taken along the lines 7—7 of FIG. 6;

FIG. 8 is a sectional view similar to the view shown in FIG. 7 in which the pinion and meshing gear are of a different diameter therefrom; and FIG. 9 is a sectional view similar to the view shown in FIG. 8 in which another pinion and another meshing gear are of a different diameter therefrom.

DESCRIPTION OF THE PREFERRED EMBODIMENT

Referring to the drawings, and especially to FIG. 1 which shows the parts of the structure in an unassembled condition, the gear-motor referred to generally by the reference numeral 34 is a reversible, hysteresis synchronous, AC motor which comprises coil forms 36 and 38 fabricated preferably of a high-impact plastic. Secured to the ends of core 83 located within the central bore of coil form 36 is a set of poles 40, and secured to the ends of core 86 located within the bore of coil form 38 is another set of poles 42, said sets of poles 40 and 42 forming the four magnetic poles of the stator. The coil 44, having terminals 45, is wound around coil form 36 and the coil 46, having terminals 47, is wound around coil form 38.

Mounted in the space between the coil forms 36 and 38 within the sets of poles 40 and 42 is a rotor 70 with its hub 68 shown secured to rotor pinion 64 which is freely rotatable about central rotor shaft 54. Also rotatably mounted on rotor shaft 54 is a planet carrier 56 that is further provided with spaced shafts 58, 60, and 62 respectively projecting in an axial direction therefrom. As seen in FIG. 7, a planet gear 66 is mounted on and freely rotatable about shaft 58 of planet carrier 56. The planet gear 66 is meshed with rotor pinion 64 and simultaneously with side-by-side peripheral internal gears 50 and 52, with internal gear 50 having one more (or less) tooth than internal gear 52.

The internal gear 50 is secured to a cup-shaped clutch housing 48 which is concentrically and rotatably supported about the innermost portion of output shaft 80 and which is frictionally biased to stationary friction washer 79. The internal gear 52 is provided with a web 53. The output shaft 80 is supported concentrically and rotatably within the bore of core 83. Said output shaft 80 is further provided with a drive blade 80a and a concentric axial hole and counterbore to accommodate respectively, rotor shaft 54 and hub 55 of planet carrier 56.

The remote end of core 86, disposed within coil form 38, is internally threaded to accommodate setscrew 88, which may be rotated to alter the compressed length of helical compression spring 84, thereby adjusting the spring force exerted on the thrust bearing 82, having a reduced portion 82a, said axial force being exerted on the central projecting end of rotor shaft 54 and being consequently transmitted to the interface between clutch housing 48 and friction washer 79, where the force provides the normal force required for development of the necessary clutch friction.

It should be apparent that by adjusting the setscrew 88 in the proper direction, the developed clutch torque can be regulated to slightly exceed the torque required to rotate a load coupled to the end 80a of output shaft 80. If coils 44 and 46 are then suitably energized, the rotor 70 and rotor pinion 64 will rotate at synchronous speed in a predetermined direction, about rotor shaft 54. The rotor pinion 64, being in mesh with planet gear 66, causes rotation thereof about shaft 58 of planet carrier 56. Planet gear 66, being also in mesh with internal gear 50, which is held firm against rotation by the frictional torque on clutch housing 48, is thus caused to revolve about the rotor pinion 64, said planet gear 66 being supported during rotation and revolution by planet carrier 56 that is journaled on rotor shaft 54. Each revolution of the planet gear 66 results in an angular displacement of internal gear 52 and output shaft 80, an integral part thereof, relative to the stationary internal gear 50, said displacement being consistent with the difference in the number of teeth thereof. Thus, the load coupled to the end 80a of output shaft 80 is caused to rotate in the desired direction and may be driven in the opposite direction by reversing the direction of rotation of rotor 70 in the usual manner.

In the event the load torque suddenly increases and thus exceeds the adjusted clutch torque during operation as described above, i.e., if the rotational stop in a potentiometer is reached, the output shaft 80 necessarily stalls causing differential rotation of internal gear 50 and clutch housing 48 in opposition to the clutch torque. It should be apparent that such differential clutch action completely eliminates potential damage to rotor, gear reduction system and/or load due to excessive motor or load torque or attempted manual rotation of the load during electrical operation.

It should be evident that, during manual rotation of the load planet gear 66 essentially locks together internal gears 50 and 52 so that such manual rotation causes the entire gear reduction system and rotor to rotate as one mass in opposition to the clutch torque developed on clutch housing 48. It should thus be apparent that the overload clutch also allows manual rotation of the load in either direction, independent of whether or not the motor is energized, such manual rotation being smooth and free from gear noise and inertia.

It should also be noted that the present clutch also functions as a brake on the load which eliminates rotation due to vibration or other causes when the motor is not energized.

As seen in FIG. 7, pinion 64, mounted on shaft 54, is meshed with planet gear 66 which is freely rotatable about its shaft 58. As shown in FIG. 8, a pinion 72 replaces the pinion 64, and a planet gear 74 is mounted on shaft 60 on the planet carrier 56 and meshes with pinion 72. FIG. 9 illustrates another arrangement in which a pinion 76 replaces the pinion 64 and a planet gear 78 is mounted on shaft 62. In the foregoing manner, the angular velocity of the output shaft 80 can be selectively changed. Thus, the only modification that must be made to the device in order to vary the output speed is that the pinion and planet gear be changed.

The housing 10 for the present motorized potentiometer as clearly shown in FIGS. 1, 2, 3 and 5, is preferably constituted of high impact plastic and takes the form of half-cylindrical shells 12 and 14 connected together by a longitudinal hinge 16. The shell 12 is provided with rather deep notches 12a and 12b while the shell 14 is also provided with opposed notches 14a and 14b. In addition, located adjacent to the notches 12a, 12b, 14a and 14b are tits 18, 20, 22 and 24 respectively. The shell 12 is further provided with semicircular cutouts 26 and 28 while the shell 14 is provided with semicircular cutouts 30 and 32 adapted to mate with cutouts 26 and 28 respectively.

The gear motor 34 is inserted in the housing in its open position and the shells 12 and 14 pivoted on hinge 16 in a direction toward each other until they close together with the mating cutouts 26 and 30 surrounding core 83 and the mating cutouts 28 and 32 surrounding the core 86. As clearly seen in FIG. 3, the notches 12a and 14a mate when closed to form an opening through which the support for the terminals 45 projects. Similarly the notches 12b and 14b mate together to form an opening through which the support for the terminals 47 projects. In order to securely hold the housing closed the tits 18 and 22 are sprung into the groove 37 of the flange 36a of coil form 36 while the tits 20 and 24 are sprung into the groove 39 of the flange 38b of coil form 38. In this manner, the gear motor is securely held in the housing but may be removed therefrom without the use of tools.

It will be noted that the end pieces 13 and 15 of the shells 12 and 14 are provided with semicircular recessed portions 89a and 89b which when mated together form a circular-shaped recess, and with four webbed portions 100a and 100b which when mated together form a rectangular opening to the circular recess, the purposes of which will be made clear hereinafter.

Fitted to the drive blade 80a of output shaft 80 is the potentiometer 90 having a slotted shaft coupling member 92 and a support 94 for the terminals 96. The rectangular, flat plate 98 of the potentiometer 90 is inserted through the correspondingly shaped opening formed by webbed portions 100a and 100b into the circular shaped combined recesses 89a and 89b of the housing. Said flat plate 98 is then turned to the position as shown in full lines in FIG. 2, in which the corners of the flat plate 98 are securely held in the circular recess by the four webbed portions 100a and 100b. The flat plate 98 is also held secure against further rotation in either direction as may be caused by the motor torque, by the two inclined plane detents 99b integrally molded on the inside of webbed portions 100b. In the foregoing manner the potentiometer 90 is secured to the housing 10 without the use of tools but may be removed therefrom, also without the use of tools, by supplying a rotative torque to the flat plate significantly larger than that required during assembly.

The slotted shaft coupling member 92 of the potentiometer 90 installed as heretofore described, is thus maintained in intimate engagement with drive blade 80a of output shaft 80, and the potentiometer may be either driven by the motor or manually operated.

What is claimed is:

1. A motor-potentiometer combination comprising a housing, a reversible motor having a stator mounted in said housing, a rotor mounted within said stator, a pinion coupled to said rotor, a planet gear, two side-by-side peripheral internal gears concentrically mounted within said stator, said planet gear being meshed with said pinion and said side-by-side peripheral internal gears, said internal gears being of equal diameter but having an unequal number of teeth, an output shaft operatively connected to one of said internal gears, a friction clutch operatively connected to the other of said internal gears, means frictionally biasing said clutch to said stator, and a potentiometer provided with a means for removably attaching said potentiometer to said housing and removably coupling said potentiometer to said output shaft of said motor.

2. A motor-potentiometer as claimed in claim 1 wherein a pinion and a planet gear of different diameters may be substituted respectively for said pinion and the said planet gear.

3. A motor-potentiometer combination as claimed in claim 1 wherein said means for biasing said clutch is a spring.

3. A motor-potentiometer combination as claimed in claim 1 further comprising means for manually adjusting the clutch torque.

5. A motor-potentiometer combination as claimed in claim 1 wherein said means for removably attaching said potentiometer to said housing is a flat plate, and a recess at one end of said housing provided with webbed portions, said flat plate being inserted in said recess and parts thereof being captured under said webbed portions to thereby removably hold said potentiometer on said housing.

6. A motor-potentiometer combination as claimed in claim 1 wherein said means for coupling said potentiometer to the output shaft of said motor is a slotted shaft which embraces said output shaft.

7. A motor-potentiometer combination as claimed in claim 1 wherein said housing is constituted of two semicylindrical shells, a hinge connecting said shells, and means on said shells for removably engaging the stator of said motor when said motor is inserted within the shells of said housing and said shells are pivoted on said hinge to a closed position.

8. A motor-potentiometer combination as claimed in claim 7 wherein said shells are each provided with a mating opening for said output shaft, a recess in each of said shells adjacent to said mating opening, said combined recesses corresponding in shape to said means for removably attaching said potentiometer to said housing.

9. A motor-potentiometer combination as claimed in claim 7 wherein said motor is provided with terminals, and cutouts in said shells for accommodating said terminals when said shells are pivoted on said hinge to their closed position.

10. A motor-potentiometer combination as claimed in claim 7 wherein said stator has a coil form, a terminal post integrally formed with said coil form, a recess in said terminal post, and the means on said shells are tits that engage in the recess on said terminal post when said shells are pivoted on said hinge to a closed position.

11. A motor-potentiometer combination as claimed in claim 4 wherein said means for manually adjusting the clutch torque is a threaded screw located in the central bore of said stator, said screw engaging the remote end of a spring and being rotatable to vary the compression thereof, thereby increasing the normal force indirectly transmitted to the clutch.

12. A gearmotor for driving a rotatable load comprising a housing, a reversible motor having a stator mounted in said housing, a rotor mounted within said stator, a pinion coupled to said rotor, a planet gear, two side-by-side peripheral internal gears, said internal gears being of equal diameter but having an unequal number of teeth, an output shaft operatively connected to one of said internal gears, a friction clutch operatively connected to the other of said internal gears, means frictionally biasing said clutch to said stator, said rotatable load being provided with means for attaching said load to said housing and removably coupling said load to the output shaft of said motor.

13. A gearmotor as claimed in claim 12 wherein a pinion and a planet gear of different diameters may be substituted respectively for said pinion and said planet gear.

14. A gearmotor as claimed in claim 12 further comprising means for manually adjusting the clutch torque.

15. A gearmotor for use in driving a rotatable load comprising a housing, a reversible motor having a stator mounted in said housing, a rotor mounted within said stator, a pinion coupled to said rotor, a planet gear, two side-by-side peripheral internal gears concentrically mounted within said stator, said planet gear being meshed with said pinion and said side-by-side internal gears, the latter being of equal diameter but having an unequal number of teeth, a clutch operatively connected to one of said internal gears, and an output shaft operatively connected to the other of said internal gears.

16. A gearmotor as claimed in claim 15 wherein a pinion and a planet gear of different diameters may be substituted respectively for said pinion and said planet gear.

* * * * *